(No Model.)

F. E. FLAGG.
RUBBER SPRING.

No. 304,632. Patented Sept. 2, 1884.

WITNESSES:
Chas. Nida
C. Sedgwick

INVENTOR:
F. E. Flagg
BY Munn & Co
ATTORNEYS.

United States Patent Office.

FRANK E. FLAGG, OF NEW YORK, N. Y.

RUBBER SPRING.

SPECIFICATION forming part of Letters Patent No. 304,632, dated September 2, 1884.

Application filed July 12, 1884. (No model.)

*To all whom it may concern:*

Be it known that I, FRANK E. FLAGG, of the city, county, and State of New York, have invented certain new and useful Improvements in Rubber Springs, of which the following is a full, clear, and exact description.

Reference is to be had to the accompanying drawings, forming a part of this specification, in which similar letters of reference indicate corresponding parts in all the figures.

Figure 1:
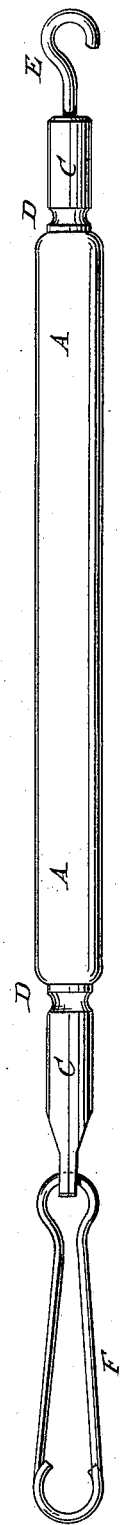
Figure 2:
Figure 3:
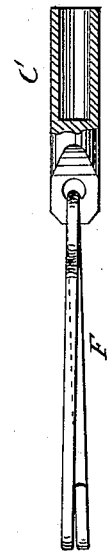

Figure 1 is a plan view of one of my improved rubber springs. Fig. 2 is a plan view of a part of the same ready to receive the metallic ferrule. Fig. 3 is a plan view of one of the metallic ferrules, partly in section.

The object of this invention is to provide simple and durable rubber springs for icemen's rubber aprons, door-bands, cage-hangers, exercising-springs, harness check-reins, and other purposes.

The invention consists in a rubber spring constructed with a rubber cord having its ends tightly and closely wound with cord, and metallic ferrules placed upon the said cord-wound ends, and having beads pressing into the inner parts of the said cord-wound ends, whereby the said ferrules will be firmly secured to the said rubber cord. The metallic ferrules are provided with connecting devices for securing the rubber spring in place, as will be hereinafter fully described.

A represents a rubber cord, which may be of any desired shape, size, and length, as the purpose for which the spring is to be used may require. The ends of the rubber cord A are tightly and closely wound with fine cord B, as shown in Fig. 2, and the said ends thus prepared are inserted in metallic ferrules C, and the said ferrules near their inner ends are compressed by means of any suitable instrument upon the said cord-wound ends, forming inwardly-projecting beads D, which beads are thus embedded in the cord-wound ends of the rubber, and securely connect the said ferrules and ends in such a manner as not to cause the rubber to break.

The ferrules C may be provided with hooks E, spring hooks or catches F, or other appliances for securing the rubber springs in place, as the purposes for which the said springs are to be used may require.

Having thus described my invention, I claim as new and desire to secure by Letters Patent—

1. A rubber spring constructed substantially as herein shown and described, and consisting of the rubber cord A, having its ends tightly and closely wound with cord B, and the metallic ferrules C, secured upon said cord-wound ends, substantially as shown and described.

2. In a rubber spring, the combination, with the rubber cord A, having its ends tightly and closely wound with cord B, of the metallic ferrules C, having beads D pressed into the said cord-wound ends, substantially as herein shown and described, whereby the said ferrules will be firmly secured to the said rubber cord, as set forth.

FRANK E. FLAGG.

Witnesses:
B. G. UNDERWOOD,
C. SEDGWICK.